United States Patent
Nakai et al.

(10) Patent No.: US 11,608,427 B2
(45) Date of Patent: Mar. 21, 2023

(54) RESIN COMPOSITION FOR SHAPING MATERIAL OF FUSED DEPOSITION MODELING METHOD-3D PRINTER AND FILAMENTARY MOLDED BODY THEREOF

(71) Applicant: UNITIKA LTD., Amagasaki (JP)

(72) Inventors: Miho Nakai, Uji (JP); Azusa Usui, Uji (JP); Shohei Kumazawa, Uji (JP); Shota Noguchi, Uji (JP); Fumio Matsuoka, Uji (JP); Hiroo Kamikawa, Uji (JP)

(73) Assignee: UNITIKA LTD., Amagasaki (JP)

( * ) Notice: Subject to any disclaimer, the term of this patent is extended or adjusted under 35 U.S.C. 154(b) by 284 days.

(21) Appl. No.: 16/757,581

(22) PCT Filed: Oct. 29, 2018

(86) PCT No.: PCT/JP2018/040079
§ 371 (c)(1),
(2) Date: Apr. 20, 2020

(87) PCT Pub. No.: WO2019/088014
PCT Pub. Date: May 9, 2019

(65) Prior Publication Data
US 2020/0362144 A1    Nov. 19, 2020

(30) Foreign Application Priority Data

Oct. 31, 2017    (JP) .............................. JP2017-210874

(51) Int. Cl.
| | | |
|---|---|---|
| C08K 7/02 | (2006.01) | |
| B33Y 70/00 | (2020.01) | |
| B29C 64/314 | (2017.01) | |
| B33Y 40/10 | (2020.01) | |
| C08L 77/00 | (2006.01) | |
| B33Y 80/00 | (2015.01) | |
| B29K 77/00 | (2006.01) | |
| B29K 201/00 | (2006.01) | |

(52) U.S. Cl.
CPC .............. *C08K 7/02* (2013.01); *B29C 64/314* (2017.08); *B33Y 40/10* (2020.01); *B33Y 70/00* (2014.12); *C08L 77/00* (2013.01); *B29K 2077/00* (2013.01); *B29K 2201/00* (2013.01); *B33Y 80/00* (2014.12); *C08K 2201/003* (2013.01); *C08K 2201/011* (2013.01); *C08K 2201/019* (2013.01); *C08L 2205/025* (2013.01)

(58) Field of Classification Search
CPC ................ C08K 7/02; C08K 2201/003; C08K 2201/011; C08K 2201/019; B33Y 40/10; B33Y 70/00; B33Y 80/00; B29C 64/314; C08L 77/00; B29K 2077/00; B29K 2201/00
See application file for complete search history.

(56) References Cited

U.S. PATENT DOCUMENTS

| | | |
|---|---|---|
| 10,227,490 B2 * | 3/2019 | Heikkila .................. C08K 7/14 |
| 2013/0030090 A1 | 1/2013 | Nakai et al. |
| 2014/0141166 A1 | 5/2014 | Rodgers |

FOREIGN PATENT DOCUMENTS

| | | |
|---|---|---|
| CN | 103214738 A | 7/2013 |
| EP | 3409452 A1 | 12/2018 |
| EP | 3479998 A1 | 5/2019 |
| JP | 2016-28887 A | 3/2016 |
| JP | 2017-502852 A | 1/2017 |
| JP | 6153680 B1 | 6/2017 |
| JP | 2017-128072 A | 7/2017 |
| JP | 2017-170881 A | 9/2017 |
| WO | WO 2015/081009 A1 | 6/2015 |
| WO | WO 2018/003379 A1 | 1/2018 |

OTHER PUBLICATIONS

Extended European Search Report for European Application No. 18874030.2, dated Oct. 30, 2020.
International Preliminary Report on Patentability, and English translation of the Written Opinion of the International Searching Authority, dated May 5, 2020, for International Application No. PCT/JP2018/040079.
International Search Report, issued in PCT/JP2018/040079, PCT/ISA/210, dated Nov. 27, 2018.
Chinese Office Action and Search Report for Chinese Application No. 201880070098.4, dated Sep. 1, 2021, with English translation of the Office Action.
Chinese Office Action for Chinese Application No. 201880070098.4, dated Apr. 2, 2022, with English translation.
Japanese Office Action for Japanese Application No. 2019-550369, dated Jun. 7, 2022, with English translation.

* cited by examiner

*Primary Examiner* — Edward J Cain
(74) *Attorney, Agent, or Firm* — Birch, Stewart, Kolasch & Birch, LLP

(57) ABSTRACT

The present invention provides a resin composition having high heat-resisting properties, with which a shaping can be performed in accordance with designed sizes using a fused deposition modeling method-3D printer, and from which a shaped object having a small warpage and small changes in sizes due to water can be obtained. The present invention relates to a resin composition for a shaping material of a fused deposition modeling method-3D printer, comprising cellulose fibers in a polyamide.

7 Claims, 1 Drawing Sheet

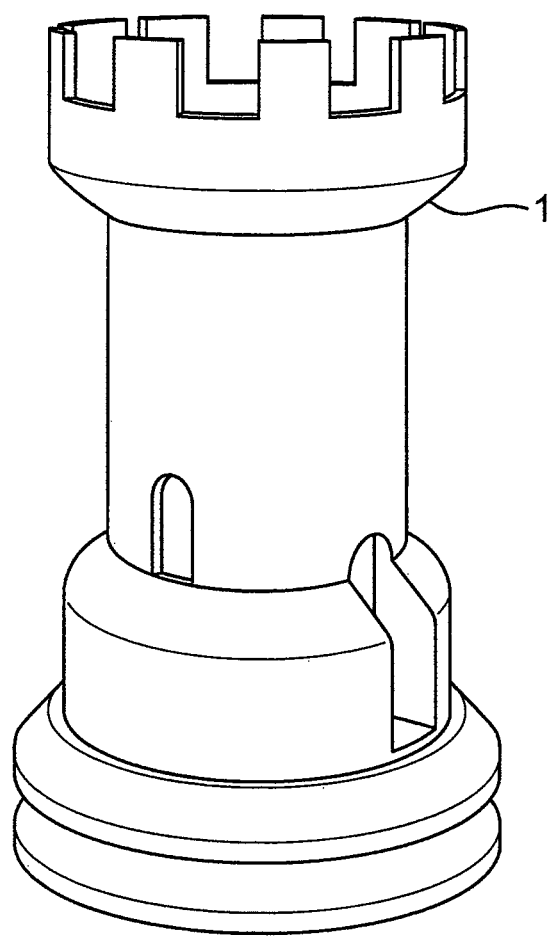

RESIN COMPOSITION FOR SHAPING MATERIAL OF FUSED DEPOSITION MODELING METHOD-3D PRINTER AND FILAMENTARY MOLDED BODY THEREOF

TECHNICAL FIELD

The present invention relates to a resin composition for a shaping material of a fused deposition modeling method-3D printer, and a filamentary molded body thereof.

BACKGROUND ART

In recent years, 3D printers for producing three-dimensional shaped objects (three-dimensional objects) based on data of 3D CAD and three-dimensional computer graphics have been rapidly spreading mainly for industrial use. Shaping methods with 3D printers include methods such as stereolithography, inkjet, powder plaster molding, selective laser sintering, and fused deposition modeling.

In recent years, in many of low-cost 3D printers for individual use and the like, a fused deposition modeling method has been employed. In these fused deposition modeling method-3D printers, a filamentary molded body is used as a shaping material, and polylactic acid (PLA) or an acrylonitrile-butadiene-styrene copolymer (ABS) resin is often used as a resin constituting the shaping material. Both PLA and ABS, however, have a problem that a shaped object obtained therefrom has a large warpage. Moreover, PLA has a melting point of about 170° C., and thus has a problem that it has low heat-resisting properties.

Meanwhile, Patent Literature 1 discloses a shaping material for a 3D printer, which contains a thermoplastic resin, cellulose nanofibers, and a dispersant. Although the resin composition of Patent Literature 1 has high heat-resisting properties, the resin composition contains a dispersant, and thus has a problem that the dispersant may bleed out of a shaped object obtained from the resin composition. In addition, there have been cases where the figure of the shaped object is distorted during shaping due to sagging (running) of the object to be shaped, and an intended shaped object is not obtained. Further, since the shaped object may have air bubbles that may cause deformation, it has sometimes been impossible to shape as designed.

CITATIONS LIST

Patent Literature

Patent Literature 1: Japanese Patent No. 6153680

SUMMARY OF INVENTION

Problems to be Solved by the Invention

Further, in Patent Literature 1, there has been a problem that when a polyamide is used as the thermoplastic resin, a shaped object as designed is not obtained, or the obtained shaped object undergoes a change in size due to water absorption, probably because the cellulose fibers are not uniformly dispersed in the polyamide.

The present invention is intended to solve the above-mentioned problems, and an object of the present invention is to provide a resin composition having high heat-resisting properties, with which shaping can be performed in accordance with designed sizes using a fused deposition modeling method-3D printer, and from which a shaped object having a small warpage after molding and small changes in sizes due to water absorption can be obtained.

Means for Solving Problems

The present inventors conducted intensive studies to solve such problems. As a result, they found that the above-mentioned object is achieved by using a resin composition containing cellulose fibers in a polyamide, and reached the present invention.

That is, the gist of the present invention is as follows.

(1) A resin composition for a shaping material of a fused deposition modeling method-3D printer, containing cellulose fibers in a polyamide.

(2) The resin composition of item (1), wherein the cellulose fibers in the resin composition have an average fiber diameter of 10 μm or less.

(3) The resin composition of item (1) or (2), wherein the polyamide is polycaproamide (Polyamide 6).

(4) The resin composition of any one of items (1) to (3), wherein the polyamide is a mixture of polycaproamide (Polyamide 6) with Polyamide 66, Polyamide 11, or Polyamide 12.

(5) The resin composition of any one of items (1) to (4), containing no dispersant.

(6) The resin composition of item (5), wherein the dispersant is a compound belonging to a nonionic surfactant, an amphoteric surfactant, a non-ionic surfactant, or a cationic surfactant.

(7) A filamentary molded body for a shaping material of a fused deposition modeling method-3D printer, containing the resin composition of any one of items (1) to (6).

(8) The filamentary molded body of item (7), wherein, in a shaped object obtained from the filamentary molded body by a 3D printer, the cellulose fibers have an average fiber diameter of 100 nm or less.

(9) A shaped object obtained by shaping the filamentary molded body of item (7) or (8).

(10) A method for producing a resin composition for a shaping material of a fused deposition modeling method-3D printer, the method including:

adding cellulose fibers during polymerization into a polyamide.

Effects of the Invention

According to the present invention, it is possible to provide a resin composition having high heat-resisting properties, with which shaping can be performed in accordance with designed sizes using a fused deposition modeling method-3D printer, and from which a shaped object having a small warpage and small changes in sizes due to water can be obtained. Moreover, the shaped object obtained using the resin composition of the present invention also has excellent adhesive properties between resin layers laminated by a fused deposition modeling method-3D printer.

Further, in the resin composition of the present invention, cellulose fibers are added during polymerization. Therefore, the cellulose fibers are uniformly dispersed, and the resin composition does not have to contain a dispersant. Since the resin composition does not have to contain a dispersant, the obtained shaped object does not cause bleed-out.

BRIEF DESCRIPTION OF DRAWING

FIG. 1 is an explanatory drawing of a "rook" produced for evaluating the shaping capability.

MODE FOR CARRYING OUT THE INVENTION

[Resin Composition]

The resin composition of the present invention is a resin composition for a shaping material of a fused deposition modeling method-3D printer, and contains cellulose fibers in a polyamide. The resin composition of the present invention may have a so-called pellet form.

The polyamide used in the present invention is a polymer having an amide bond, and is formed from an amino acid, a lactam, or a diamine and a dicarboxylic acid.

Examples of the amino acid include 6-aminocaproic acid, 11-aminoundecanoic acid, 12-aminododecanoic acid, and p-aminomethylbenzoic acid.

Examples of the lactam include ε-caprolactam and ω-laurolactam.

Examples of the diamine include tetramethylenediamine, hexamethylenediamine, nonamethylenediamine, decamethylenediamine, undecamethylenediamine, dodecamethylenediamine, 2,2,4-/2,4,4-trimethylhexamethylenediamine, 5-methylnonamethylenediamine, 2,4-dimethyloctamethylenediamine, m-xylylenediamine, p-xylylenediamine, 1,3-bis(aminomethyl)cyclohexane, 1-amino-3-aminomethyl-3,5,5-trimethylcyclohexane, 3,8-bis(aminomethyl)tricyclodecane, bis(4-aminocyclohexyl)methane, bis(3-methyl-4-aminocyclohexyl)methane, 2,2-bis(4-aminocyclohexyl)propane, and bis(aminopropyl)piperazine.

Examples of the dicarboxylic acid include adipic acid, suberic acid, azelaic acid, sebacic acid, dodecanedioic acid, terephthalic acid, isophthalic acid, naphthalenedicarboxylic acid, 2-chloroterephthalic acid, 2-methylterephthalic acid, 5-methylisophthalic acid, 5-sodium sulfoisophthalic acid, hexahydroterephthalic acid, hexahydroisophthalic acid, and diglycolic acid.

Specific examples of the polyamide used in the present invention include polycaproamide (Polyamide 6), polytetramethylene adipamide (Polyamide 46), polyhexamethylene adipamide (Polyamide 66), polyhexamethylene sebacamide (Polyamide 610), polyhexamethylene dodecamide (Polyamide 612), polyundecamethylene adipamide (Polyamide 116), polyundecanamide (Polyamide 11), polydodecanamide (Polyamide 12), polytrimethylhexamethylene terephthalamide (Polyamide TMHT), polyhexamethylene terephthalamide (Polyamide 6T), polyhexamethylene isophthalamide (Polyamide 6I), polyhexamethylene terephthal/isophthalamide (Polyamide 6T/6I), polybis(4-aminocyclohexyl)methane dodecamide (Polyamide PACM12), polybis(3-methyl-4-aminocyclohexyl)methane dodecamide (Polyamide dimethyl PACM12), polymetaxylylene adipamide (Polyamide MXD6), polynonamethylene terephthalamide (Polyamide 9T), polydecamethylene terephthalamide (Polyamide 10T), polyundecamethylene terephthalamide (Polyamide 11T), and polyundecamethylene hexahydroterephthalamide (Polyamide 11T(H)). The polyamide may also be a copolymer or a mixture of these compounds. Among them, Polyamide 6, Polyamide 66, Polyamide 11, Polyamide 12, and copolymers and mixtures thereof are preferable, and Polyamide 6 is more preferable because it undergoes small changes in sizes due to water when used in combination with cellulose fibers. It is preferable to use Polyamide 6 alone from the viewpoint of further improving the shaping capability for the shaped object as well as the size change rate after water absorption of the shaped object.

The polyamide is produced by a polymerization method described later, or further in combination with a solid phase polymerization method. The molecular weight of the polyamide is not particularly limited, and may be, for example, a molecular weight at which the resin composition of the present invention may have a relative viscosity and/or a melting point described later.

Examples of the cellulose fibers used in the present invention include those derived from plants such as wood, rice, cotton, hemp, and kenaf. It is to be noted that examples of the cellulose fibers also include those derived from living organisms, such as bacterial cellulose, Valonia cellulose, and ascidian cellulose, as well as regenerated cellulose and cellulose derivatives. Examples of commercially available products of plant-derived cellulose fibers include "CELISH" made by Daicel FineChem Ltd.

In the present invention, in order to obtain a shaped object having satisfactory size stability, shaping capability, and size change rate after water absorption, it is preferable that the cellulose fibers be uniformly dispersed in the resin without being aggregated. In order to uniformly disperse cellulose fibers in the resin, it is preferable to use cellulose fibers that are finely divided as much as possible. Therefore, the cellulose fibers contained in the shaped object of the present invention preferably have an average fiber diameter of 10 μm or less, more preferably 500 nm or less, even more preferably 200 nm or less. The average fiber diameter of the cellulose fibers in the shaped object is preferably 100 nm or less, more preferably 80 nm or less, even more preferably 50 nm or less, from the viewpoint of ease of processing into filaments, and further improvement of the shaping capability for the shaped object, the size stability with respect to the designed size, the size change rate after water absorption and interlayer adhesive properties, as well as further reduction of the warpage and bleed-out. The lower limit of the average fiber diameter of the cellulose fibers in the shaped object is not particularly limited, and the average fiber diameter is usually 2 nm or more, and is preferably more than 40 nm from the viewpoint of further improvement of the shaping capability.

In order to make the average fiber diameter of the cellulose fibers in the resin composition 10 μm or less, it is preferable to use cellulose fibers having an average fiber diameter of 10 μm or less. Such cellulose fibers are preferably those obtained by microfibrillation of cellulose fibers by tearing. As a means for microfibrillation, various pulverizers such as a ball mill, a stone mill pulverizer, a high-pressure homogenizer, and a mixer can be used. Examples of commercially available products of such cellulose fibers include "CELISH" made by Daicel FineChem Ltd.

In addition, as the cellulose fibers having an average fiber diameter of 10 μm or less, an aggregate of cellulose fibers output as waste threads in a production process of a textile product including cellulose fibers can also be used. Examples of the production process of a textile product include processes of spinning, fabric weaving, production of a non-woven fabric, as well as textile product processing. In these aggregates of cellulose fibers, since the cellulose fibers are waste threads obtained after having passed through the above-mentioned processes, the cellulose fibers are finely divided.

As the cellulose fibers having an average fiber diameter of 10 μm or less, bacterial cellulose produced by bacteria can also be used. For example, bacterial cellulose produced from acetic acid bacteria of the genus *Acetobacter* as producing bacteria can be used. Plant cellulose fibers are those in which the molecular chains of the cellulose fibers are converged and are formed from a bundle of very fine microfibrils, whereas cellulose fibers produced from acetic acid bacteria are originally in a ribbon shape having a width of 20 to 50 nm, and form an extremely fine mesh compared with plant cellulose fibers.

Further, as the cellulose fibers having an average fiber diameter of 10 μm or less, finely-divided cellulose fibers may also be used, the micronized cellulose fibers being obtained by oxidizing cellulose fibers in the presence of an N-oxyl compound, and then subjecting the cellulose fibers to steps of washing with water and physical defibration. There are various N-oxyl compounds. For example, a 2,2,6,6-tetramethylpiperidine-1-oxyl radical or the like as described in Cellulose (1998) 5, 153-164 is preferable. The N-oxyl compound is added to an aqueous reaction solution in the range of a catalytic amount. To the aqueous solution, sodium hypochlorite or sodium chlorite is added as a co-oxidizing agent, and an alkali metal bromide is added to allow the reaction to proceed. An alkaline compound such as an aqueous sodium hydroxide solution is added to maintain the pH at around 10, and the reaction is continued until no change in pH is observed. The reaction temperature may be room temperature. After the reaction, it is preferable to remove the N-oxyl compound remaining in the system. For the washing, various methods such as filtration and centrifugation can be adopted. Then, using various pulverizers as described above, finely divided cellulose fibers can be obtained through a physical defibration step.

The cellulose fibers in the resin composition of the present invention preferably have an aspect ratio, which is a ratio between the average fiber diameter and the average fiber length (average fiber length/average fiber diameter), of 10 or more, more preferably 50 or more, even more preferably 100 or more. When the aspect ratio is 10 or more, the obtained shaped object easily has improved size stability.

The content of the cellulose fibers constituting the resin composition of the present invention is not particularly limited. The content of the cellulose fibers is preferably 0.1 to 50 parts by mass, more preferably 0.5 to 15 parts by mass, even more preferably 1 to 12 parts by mass, and particularly preferably 0.5 to 10 parts by mass based on 100 parts by mass of the polyamide, from the viewpoint of ease of processing into filaments, and further improvement of the shaping capability for the shaped object, the size stability with respect to the designed size, the size change rate after water absorption and interlayer adhesive properties, as well as further reduction of the warpage and bleed-out.

Since the resin composition of the present invention, which is obtained by a production method as described later, is a resin composition in which cellulose fibers are uniformly dispersed in the polyamide, shaping can be performed with the resin composition in accordance with designed sizes using a fused deposition modeling method-3D printer, and a shaped object having a small warpage and small changes in sizes due to water can be obtained.

[Method for Producing Resin Composition]

The resin composition of the present invention can be produced by adding cellulose fibers during polymerization into a polyamide. More specifically, it is possible to produce the polyamide composition of the present invention containing cellulose fibers by mixing a monomer constituting the polyamide with an aqueous dispersion of cellulose fibers having an average fiber diameter of 10 μm or less, and causing a polymerization reaction. It is to be noted that in the case where any additive that can be added to the resin composition described later is added during the polymerization reaction, the "resin composition" refers to the one that contains the additive. The wording "during polymerization into a polyamide" encompasses not only during the polymerization using a monomer constituting the polyamide, but also during the polymerization using a prepolymer that can constitute the polyamide.

Cellulose fibers have a very high affinity for water. The smaller the average fiber diameter of the cellulose fibers is, the better the dispersed state in water the cellulose fibers can maintain. Further, when the cellulose fibers lose water, the cellulose fibers are strongly aggregated together by hydrogen bond, and once the cellulose fibers are aggregated, the cellulose fibers hardly assume the same dispersed state as that before the aggregation. In particular, this tendency is more remarkable as the average fiber diameter of the cellulose fibers is smaller. Accordingly, it is preferable that the cellulose fibers form a composite with the polyamide in a water-containing state. Therefore, in the present invention, during polymerization into a polyamide, it is preferable to employ a method of obtaining a polyamide resin composition containing cellulose fibers by causing a polymerization reaction of a monomer constituting the polyamide in the presence of cellulose fibers in a water-containing state. According to such a production method, it becomes possible to uniformly disperse the cellulose fibers in the polyamide without aggregation.

An aqueous dispersion of cellulose fibers is a dispersion obtained by dispersing cellulose fibers having an average fiber diameter of 10 μm or less in water, and it is preferable that the content of cellulose fibers in the aqueous dispersion be 0.01 to 100% by mass, particularly 0.1 to 10% by mass. The aqueous dispersion of cellulose fibers can be obtained by stirring purified water and cellulose fibers with a mixer or the like. Then, the aqueous dispersion of cellulose fibers and the monomer constituting the polyamide are mixed and stirred with a mixer or the like to form a uniform dispersion liquid. After that, the dispersion liquid is heated to raise the temperature to 150 to 270° C., and stirred to cause a polymerization reaction. In this process, water vapor can be gradually discharged during heating of the dispersion liquid to discharge the water in the aqueous dispersion of cellulose fibers. It is to be noted that at the time of polymerization into the polyamide, a catalyst such as phosphoric acid or phosphorous acid may be added as necessary. After the completion of the polymerization reaction, it is preferable that the obtained resin composition be discharged and then cut into pellets.

When bacterial cellulose is used as the cellulose fibers, a product obtained by immersing bacterial cellulose in purified water to subject the bacterial cellulose to solvent replacement may be used as the aqueous dispersion of cellulose fibers. When bacterial cellulose having been subjected to solvent replacement is used, it is preferable to adjust, after the solvent replacement, the aqueous dispersion of cellulose fibers to have a predetermined concentration, mix the aqueous dispersion with a monomer constituting the polyamide, and allow a polymerization reaction to proceed similarly to the above.

In the above-mentioned method, when cellulose fibers having an average fiber diameter of 10 μm or less are used and the cellulose fibers to be subjected to the polymerization reaction are in a state of an aqueous dispersion, the cellulose fibers are subjected to the polymerization reaction in a state of having satisfactory dispersibility. Further, due to the interaction of the cellulose fibers subjected to the polymerization reaction with the monomer and water during the polymerization reaction as well as stirring under the above-mentioned temperature conditions, the cellulose fibers have improved dispersibility, the fibers are not aggregated together, and a resin composition in which cellulose fibers having a small average fiber diameter are satisfactorily dispersed can be obtained. It is to be noted that according to the above-mentioned method, the average fiber diameter and the fiber length of the cellulose fibers contained in the resin composition after the completion of the polymerization reaction may be smaller than the average fiber diameter of the cellulose fibers added before the polymerization reaction.

In the above-mentioned method, no step of drying the cellulose fibers is required, and a resin composition can be produced without a step in which finely-divided cellulose fibers are scattered. Therefore, the method can provide the resin composition with high operability. In addition, since it is not necessary to replace water with an organic solvent for the purpose of uniformly dispersing the cellulose fibers in the monomer, the method is satisfactory in handling quality, and can suppress the discharge of chemical substances during the production process.

The relative viscosity of the resin composition of the present invention, when measured at a temperature of 25° C. and a concentration of 1 g/100 mL using 96% sulfuric acid as a solvent, is preferably 1.5 to 5.0, more preferably 1.7 to 4.0 from the viewpoint of shaping capability.

The melting point of the resin composition of the present invention is preferably 180° C. or higher. If the melting point is lower than 180° C., the obtained shaped object may have low heat-resisting properties and may be limited in use.

The resin composition of the present invention can contain, as long as the object of the present invention is not impaired, additives such as fillers (for example, glass beads, glass fiber powder, wollastonite, mica, synthetic mica, sericite, talc, clay, sericite, zeolite, bentonite, kaolinite, dolomite, silica, potassium titanate, finely divided silicic acid, shirasu balloon, calcium carbonate, magnesium carbonate, barium sulfate, aluminum oxide, magnesium oxide, calcium oxide, titanium oxide, silicon oxide, aluminum silicate, zirconium silicate, gypsum, graphite, montmorillonite, carbon black, calcium sulfide, zinc oxide, and boron nitride), coloring agents including dyes and pigments, antistatic agents, end-capping agents, UV inhibitors, light stabilizers, anti-clouding agents, anti-fogging agents, plasticizers, flame retardants, anti-coloring agents, anti-gumming agents, antioxidants, releasing agents, desiccants, oxygen barrier agents, and nucleating agents. Moreover, two or more of these may be used in combination. The particle size of these additives is preferably 60 μm or less in order to obtain a filamentary molded body with satisfactory yarn-making properties. When the resin composition of the present invention contains the above-mentioned additives, the additives may be added during polymerization into a polyamide similarly to the cellulose fibers, or may be added to the resin composition pellets containing the cellulose fibers and dry-blended therewith.

However, it is preferable that the resin composition of the present invention do not contain a dispersant from the viewpoint of not only reduction of the bleed-out, but also further improvement of the shaping capability for the shaped object, and improvement of the size stability with respect to the designed size, the size change rate after water absorption and interlayer adhesive properties, as well as reduction of the warpage. That is, it is preferable that the resin composition of the present invention contain no dispersant from the above-mentioned viewpoint, and more specifically, it is preferable that the content of the dispersant be 0.5% by mass or less, particularly 0.1% by mass or less based on the total amount of the resin composition.

As for the content of the dispersant in the resin composition, a value measured by the following method is used.

The content is measured by dissolving the composition in TFA-d (trifluoroacetic acid), and then subjecting the resulting solution to $^1$H-NMR.

The dispersant is a compound belonging to a nonionic surfactant, an amphoteric surfactant, an anionic surfactant, or a cationic surfactant.

Examples of the nonionic surfactant include glycerin fatty acid esters, polyoxyalkylene glycols, and sorbitan fatty acid esters.

Examples of the glycerin fatty acid esters include glycerin monostearate, glycerin monobehenate, glycerin mono 12-hydroxystearate, glycerin monooleate, glycerin monocaprylate, succinic fatty acid monoglyceride, and citric fatty acid monoglyceride.

Examples of the polyoxyalkylene glycols include polyethylene glycol (for example, Polyethylene glycol 200), polypropylene glycol, polybutylene glycol, polyoxyethylene polyoxypropylene glycol, polyglycerin, polyoxyethylene glycerin, and an ethylene oxide-propylene oxide block copolymer.

Examples of the sorbitan fatty acid esters include sorbitan monostearate, sorbitan laurate, sorbitan oleate, and sorbitan trioleate.

Examples of the amphoteric surfactant include a (meth) acryloyloxyethyl phosphorylcholine-containing polymer. The (meth)acryloyloxyethyl phosphorylcholine-containing polymer is a homopolymer or a copolymer containing (meth)acryloyloxyethyl phosphorylcholine as a monomer component. The wording "(meth)acryloyloxyethyl phosphorylcholine" encompasses acryloyloxyethyl phosphorylcholine and methacryloyloxyethyl phosphorylcholine. The copolymer component for (meth)acryloyloxyethyl phosphorylcholine is not particularly limited as long as it is a monomer component copolymerizable with (meth)acryloyloxyethyl phosphorylcholine, and examples of the copolymer component include (meth)acrylic acid, methyl (meth) acrylate, ethyl (meth)acrylate, and butyl (meth)acrylate. The wording "(meth)acrylic acid" encompasses acrylic acid and methacrylic acid. The content rate of (meth)acryloyloxyethyl phosphorylcholine in the (meth)acryloyloxyethyl phosphorylcholine copolymer is usually 0.0005% by mass or more, preferably 15% by mass or more, more preferably 30% by mass or more based on all the constituent monomer components.

The (meth)acryloyloxyethyl phosphorylcholine-containing polymer is available, for example, as LIPIDURE HM (a methacryloyloxyethyl phosphorylcholine homopolymer made by NOF CORPORATION).

Examples of the anionic surfactant include sodium alkylbenzene sulfonate, sodium alkyl sulfate, and sodium alkyl ether sulfate.

Examples of the cationic surfactant include stearylamine acetate and lauryltrimethylammonium chloride.

[Filamentary Molded Body and Method for Producing the Same]

The filamentary molded body of the present invention, which is obtained by forming the resin composition of the present invention into a filament shape by a known method, can be suitably used as a shaping material of a fused deposition modeling method-3D printer. The filamentary molded body may be either monofilaments or multifilaments, but is preferably monofilaments. Moreover, the monofilaments and the multifilaments may be either unstretched or stretched.

It is preferable that the filamentary molded body have a diameter of 1.5 to 3.2 mm, particularly preferably 1.6 to 3.1 mm. The diameter of the filamentary molded body is the average of the maximum major axis and the minimum minor axis in a cross section obtained by cutting the filamentary molded body perpendicularly to the longitudinal direction of the filamentary molded body. If the filamentary molded body has a diameter less than 1.5 mm, the filamentary molded body may be too thin to be suitable for a general-purpose fused deposition modeling method-3D printer. It is to be noted that the upper limit of the diameter of the filamentary molded body suitable for a general-purpose fused deposition modeling method-3D printer is about 3.2 mm.

An example of a method for producing a filamentary molded body made of monofilaments is a method in which the resin composition of the present invention is melted at 220 to 290° C. and extruded from a nozzle hole (diameter: 5 mm) with a constant amount supply device, and the extruded resin composition is cooled to solidify in a liquid bath of 20 to 80° C., then taken up at a spinning speed of 1 to 50 m/min, and wound on a bobbin or the like. It is to be noted that when the resin composition is made into the shape of monofilaments, the resin composition may be stretched at a ratio in a certain range.

[Shaped Object and Method for Producing the Same]

The shaped object of the present invention can be obtained by shaping the filament molded body (raw material) using a fused deposition modeling method-3D printer.

Recently, 3D printers of a type in which a plurality of materials or raw materials are simultaneously supplied and subjected to composite shaping have been commercially available. In the present invention, it is also possible to obtain, using the composite material-compatible 3D printer, a shaped object made of a composite material by simultaneously supplying a filament molded body of the resin composition of the present invention together with a filament molded body of another resin composition, or another raw material, and shaping the materials. Examples of another raw material include continuous fibers and discontinuous fibers such as carbon fibers, aramid fibers, and glass fibers, as well as fiber-reinforced resin filaments including the above-mentioned fibers.

Since the shaped object of the present invention contains the resin composition containing cellulose fibers and a polyamide, the size stability of the shaped object measured by the evaluation method described later can be made 0.5% or less, preferably 0.3% or less, more preferably 0.2% or less, even more preferably 0.1% or less. In addition, the obtained shaped object may have a size change rate before and after immersion treatment in water at 23° C., which is measured by the evaluation method described later, of 2.0% or less, preferably 1.5% or less, more preferably 1.2% or less.

In addition, since the shaped object of the present invention contains the resin composition containing cellulose fibers and a polyamide, the shaped object may have a reduced warpage. Further, the shaped object of the present invention also has excellent adhesive properties between resin layers laminated by a fused deposition modeling method.

In addition, since the shaped object of the present invention contains no dispersant, the obtained shaped object can be made free of bleed-out. When bleed-out occurs in the shaped object, the shaped object may have a poor appearance, and a problem of adhesion of a chemical substance may occur. In addition, since the shaped object of the present invention contains no dispersant, the obtained shaped object may have a further reduced warpage.

EXAMPLES

Hereinafter, the present invention will be specifically described with reference to examples, but the present invention is not limited thereto. It is to be noted that the resin composition, the obtained monofilaments, and the obtained shaped object were evaluated by the following methods.

A. Evaluation Methods (1) Average Fiber Diameter of Cellulose Fibers in Shaped Object From a shaped object, a section having a thickness of 100 nm was collected using a freezing ultramicrotome, and the section was stained, followed by observation using a transmission electron microscope (JEM-1230 made by JEOL Ltd.). From the electron microscope image, the length of a cellulose fiber (single fiber) in a direction perpendicular to the longitudinal direction of the cellulose fiber was measured. In the measurement, the maximum length in the perpendicular direction was defined as the fiber diameter. Fiber diameters of arbitrary ten cellulose fibers (single fibers) were similarly measured, and the average of the ten fibers was calculated as the average fiber diameter.

It is to be noted that for cellulose fibers having a large fiber diameter, a 10-μm section cut out with the microtome, or a shaped object in the original state was observed using a stereomicroscope (OLYMPUS SZ-40). From the image thus obtained, the fiber diameters were measured in the same manner as described above, and the average fiber diameter was determined.

The shaped object was produced by a 3D printer using monofilaments (that is, a filamentary molded body). The conditions of production using the 3D printer were as follows.

3D printer: NJB-200HT (made by Ninjabot)

Nozzle temperature: Mp+30 to Mp+50 (° C.) (Mp is the melting point (° C.) of the resin composition)

Table temperature: Tg−20 to Tg (° C.) (Tg is the glass transition temperature (° C.) of the resin composition)

Printing speed: 50 mm/sec

Nozzle diameter: 0.4 mm

Thickness of one layer: 0.2 mm

Shape of shaped object (set value): plate shape 25 mm in length×25 mm in width×2 mm in height (2) Melting Point of Resin Composition A measurement sample was heated to 350° C. at a heating rate of 20° C./min by a differential scanning calorimeter (made by PerkinElmer; DSC-7), and then maintained at 350° C. for 5 minutes. Then, the measurement sample was cooled to 25° C. at a cooling rate of 20° C./min. Then, the measurement sample was further maintained at 25° C. for 5 minutes. After that, the measurement sample was subjected to temperature rise measurement again at the heating rate of 20° C./min, and the temperature at the top of the endothermic peak was measured as the melting point.

(3) Yarn-Making Properties

The yarn-making properties were evaluated according to the following criteria based on the number of yarn breaks during the period of 24 hours in which monofilaments having a diameter of 1.75 mm were collected at a spinning speed of 10 m/min.

○: Number of yarn breaks was 0 times.

Δ: Number of yarn breaks was 1 to 3 times.

×: Number of yarn breaks was 4 or more times, or the filaments were incapable of being taken up.

(4) Diameter of Monofilaments

The obtained monofilaments were cut at every 20 cm perpendicularly to the longitudinal direction of the monofilaments to produce thirty measurement samples. The maximum major axis and the minimum minor axis in a cross section of each sample were measured using a micrometer, the average of the maximum major axis and the minimum minor axis was calculated, and the calculated value was defined as the average diameter. The average diameters of all the thirty samples were averaged to obtain the diameter of the monofilaments.

(5) Shaping Capability with 3D Printer

Using monofilaments and using a 3D printer (made by Ninjabot, NJB-200HT), the "rook" shown in FIG. 1 was shaped under the conditions of a nozzle temperature of Mp+30 to Mp+50 (° C.) (Mp is the melting point (° C.) of the resin composition), a table temperature of Tg−20 to Tg (° C.) (Tg is the glass transition temperature (° C.) of the resin composition), a printing speed of 50 mm/sec, a nozzle diameter of 0.4 mm, and a thickness of one layer of 0.2 mm. The monofilaments were evaluated as "×" when the resin was not discharged uniformly, when the filaments were not smoothly unwound from the bobbin due to the adhesiveness and the resin was not stably supplied, or when the monofilaments had so large a warpage that they were peeled off from the shaping table and incapable of being shaped. When the monofilaments were capable of being shaped, the appearance of the portion denoted by reference sign 1 in FIG. 1 (overhang portion) was evaluated according to the following criteria.

⊙: No air bubbles were observed, and sagging (running) did not occur at the overhang portion.

○: Air bubbles were observed, but sagging (running) did not occur at the overhang portion.

Δ: Sagging (running) occurred at the overhang portion.

In the present invention, "Δ" or better evaluation was judged as pass.

(6) Size Stability

Using monofilaments and using a 3D printer (made by Ninjabot, NJB-200HT), a plate was shaped under the conditions of a nozzle temperature of Mp+30 to Mp+50 (° C.) (Mp is the melting point (° C.) of the resin composition), a table temperature of Tg−20 to Tg (° C.) (Tg is the glass transition temperature (° C.) of the resin composition), a printing speed of 50 mm/sec, a nozzle diameter of 0.4 mm, and a thickness of one layer of 0.2 mm with the size (set value) of the plate being set to be 25 mm in length×25 mm in width×2 mm in height.

Ten plates were shaped by the above-mentioned method, and the lengths and widths of the plates were each measured using Image Dimension Measurement System made by KEYENCE CORPORATION. The average size was determined from twenty values [2 (length and width)×10 (number of plates)], and the size stability was evaluated using the following formula.

Size stability=[average size of obtained shaped objects−set size (25 mm)]/[set size (25 mm)]×100

For practical use, the size stability needs to be 0.5% or less in the absolute value (Δ), and the size stability is preferably 0.2% or less (○), more preferably 0.1% or less (⊙).

(7) Rate of Size Change Due to Water

Ten plates were shaped in the same manner as in item (6), and each plate was immersed in water at 23° C. for 1000 hours. After 1000 hours, the lengths and widths of the plates subjected to the immersion treatment were each measured using Image Dimension Measurement System made by KEYENCE CORPORATION. The average size was determined from twenty values [2 (length and width)×10 (number of plates)], and the rate of size change due to water was evaluated using the following formula.

Rate of size change due to water=(average size after immersion treatment−average size before immersion treatment)/average size before immersion treatment×100

For practical use, the rate of size change due to water needs to be 2.0% or less in the absolute value (Δ), and the rate of size change due to water is preferably 1.5% or less (○), more preferably 1.2% or less (⊙).

(8) Warpage

A plate was shaped in the same manner as in item (6), and the plate was placed on a horizontal plane. The rise of a portion raised highest from the horizontal plane was measured and evaluated according to the following criteria.

○: less than 0.1 mm

Δ: 0.1 mm or more and less than 0.2 mm

×: 0.2 mm or more (9) Presence or Absence of Bleed-Out

A plate was shaped in the same manner as in item (6), and the plate was left standing in a thermostat at 60° C. for 72 hours. After 72 hours, the surface of the plate was visually evaluated according to the following criteria. The presence of bleed-out was judged by the gloss of the surface.

○: Bleed-out was observed.

×: No bleed-out was observed.

(10) Adhesive Properties Between Resin Layers Laminated by Fused Deposition Modeling Method-3D Printer A plate was shaped in the same manner as in item (6), curved by hand, and the condition of the interface between the laminated resin layers was visually evaluated according to the following criteria.

○: No cracks or gaps were generated.

×: Cracks or gaps were generated.

(11) Comprehensive Evaluation of Shaped Objects

All the evaluation results of the shaped objects were comprehensively evaluated.

⊙: All the evaluation results of the shaped object were "○" or better evaluation, and among them, the number of evaluation results "⊙" was three.

○: All the evaluation results of the shaped object were "○" or better evaluation, and among them, the number of evaluation results "⊙" was zero to two.

Δ: The worst evaluation result among all the evaluation results of the shaped object was "Δ".

×: The worst evaluation result among all the evaluation results of the shaped object was "×".

(12) Glass Transition Temperature of Resin Composition

The glass transition temperature was measured by a method of raising the temperature under the condition of a heating rate of 20° C./min, and obtaining an intermediate value between two bending point temperatures derived from the glass transition in the heating curve.

B. Raw Materials (1) Resin

PLA: Polylactic acid, 3001D made by NatureWorks LLC

ABS: Acrylonitrile-butadiene-styrene copolymer resin, TECHNO ABS 130 made by Techno Polymer Co., Ltd.

Polyamide 6: A1030BRL made by UNITIKA LTD.

PA66: Polyamide 66, VYDYNE 50BWFS made by Ascend Performance Materials

PA11: Polyamide 11, RILSAN BMN made by Arkema

PA12: Polyamide 12, 3024U made by Ube Industries, Ltd.

(2) Cellulose Fibers

CELISH KY100G: made by Daicel FineChem Ltd., 10% by mass of cellulose fibers having an average fiber diameter of 125 nm contained in water CELISH KY100S: made by Daicel FineChem Ltd., 25% by mass of cellulose fibers having an average fiber diameter of 140 nm contained in water Bacterial Cellulose:

A medium (50 ml) having a composition containing 0.5% by mass of glucose, 0.5% by mass of polypeptone, 0.5% by mass of yeast extract, and 0.1% by mass of magnesium sulfate heptahydrate was dispensed into a 200-ml Erlenmeyer flask, and steam-sterilized in an autoclave at 120° C. for 20 minutes. Into the medium, one loopful of *Gluconacetobacter xylinus* (NBRC 16670) grown on a test tube slant agar medium was inoculated, and the medium was subjected to static culture at 30° C. for 7 days. After 7 days, bacterial cellulose in the form of a white gel film was formed in the upper layer of the broth.

The obtained bacterial cellulose was crushed with a mixer, and then repeatedly immersed in and washed with water to perform water replacement, thereby preparing an aqueous dispersion containing 4.1% by mass of bacterial cellulose having an average fiber diameter of 60 nm.

Waste Threads:

To an aggregate of cellulose fibers output as waste threads in a production process of a non-woven fabric, purified water was added, and the resulting mixture was stirred with a mixer to prepare an aqueous dispersion containing 6% by mass of cellulose fibers having an average fiber diameter of 3240 nm.

(3) Dispersant

Dispersant a: glyceryl stearate made by KANTO CHEMICAL CO., INC.

Dispersant b: Polyethylene glycol 200 made by Tokyo Chemical Industry Co., Ltd.

Dispersant c: sorbitan monostearate made by KANTO CHEMICAL CO., INC.

Dispersant d: a methacryloyloxyethyl phosphorylcholine homopolymer, LIPIDURE HM made by NOF CORPORATION

Example 1

Purified water was added to CELISH KY100G, and the resulting mixture was stirred with a mixer to prepare an aqueous dispersion having a cellulose fiber content of 3% by mass.

The aqueous dispersion of cellulose fibers (100 parts by mass) and ε-caprolactam (100 parts by mass) were further stirred and mixed with a mixer until a uniform solution was obtained. Subsequently, the mixed solution was heated to 240° C. with stirring, and the pressure was increased from 0 kgf/cm$^2$ to 7 kgf/cm$^2$ with water vapor being gradually discharged. Then, the pressure was released to the atmospheric pressure, and the mixed solution was subjected to a polymerization reaction at 240° C. for 1 hour. When the polymerization was completed, the obtained resin composition was discharged and cut into pellets. The obtained pellets were treated with hot water at 95° C., refined, and dried.

Then, the obtained dried resin composition pellets were extruded from a spinneret having a round cross section and having one hole with a hole diameter of 5 mm using a spinning tester (made by Fuji Filter Manufacturing Co., Ltd., screw diameter: 30 mm, melt extrusion zone: 1000 mm) under the conditions of a spinning temperature of 250° C. and a discharge rate of 39 g/min. Subsequently, the extruded monofilaments were immersed in cooling hot water at 50° C. at a position 20 cm below the spinneret, and taken up with the cooling time and the take-up speed being adjusted to 1 minute and 16.5 m/min, respectively, to give monofilaments having an average fiber diameter of 1.74 mm as a filamentary molded body.

Example 2

The aqueous dispersion having a cellulose fiber content of 3% by mass obtained in Example 1 (100 parts by mass) and Nylon 66 salt (100 parts by mass) as a prepolymer were stirred and mixed with a mixer until a uniform solution was obtained. Subsequently, the mixed solution was heated at 230° C. with stirring until the internal pressure reached 15 kgf/cm$^2$. After the pressure was reached, the pressure was maintained by continuous heating with water vapor being gradually discharged. When the temperature reached 280° C., the pressure was released to normal pressure, and the mixed solution was further polymerized for 1 hour. When the polymerization was completed, the obtained resin composition was discharged and cut into pellets. The obtained pellets were treated with hot water at 95° C., refined, and dried. Then, using the obtained dried resin composition pellets, the same operation as in Example 1 was performed to give monofilaments having an average fiber diameter of 1.75 mm.

Examples 3 to 5

The same operation as in Example 1 was performed except that the blending amount of CELISH KY100G was changed so that the content of the cellulose fibers might be the value shown in Table 1 to give dried resin composition pellets.

Then, using the obtained dried resin composition pellets, the same operation as in Example 1 was performed to give monofilaments having an average fiber diameter of 1.73 to 1.76 mm.

Example 6

The same operation as in Example 1 was performed except that CELISH KY100G was changed to CELISH KY100S to give dried resin composition pellets.

Then, using the obtained dried resin composition pellets, the same operation as in Example 1 was performed to give monofilaments having an average fiber diameter of 1.74 mm.

Examples 7 and 8

The same operation as in Example 1 was performed except that the type and blending amount of the used aqueous dispersion of cellulose fibers were changed so that the type and content of the cellulose fibers might be the values shown in Table 1 to give dried resin composition pellets.

Then, using the obtained dried resin composition pellets, the same operation as in Example 1 was performed to give monofilaments having an average fiber diameter of 1.75 to 1.76 mm.

Examples 9 to 11

The resin composition pellets obtained in Example 3 (105 parts by mass) and the polyamide resin shown in Table 1

(i.e., Polyamide 66, Polyamide 11, or Polyamide 12) (18 parts by mass), which is different from the polyamide resin used in the polymerization, were dry-blended, and the resulting blend was supplied to a main hopper of a twin-screw extruder. The blend was sufficiently melt-kneaded at 260° C., discharged into a strand, and cut to give resin composition pellets.

Then, using the obtained dried resin composition pellets, the same operation as in Example 1 was performed to give monofilaments having an average fiber diameter of 1.73 to 1.74 mm.

Comparative Example 1

The same operation as in Example 1 was performed except that no cellulose fibers were used to give dried resin composition pellets.

Then, using the obtained dried resin composition pellets, the same operation as in Example 1 was performed to give monofilaments having an average fiber diameter of 1.75 mm.

Comparative Example 2

Into FILMIX model 56-50 made by PRIMIX Corporation, a slurry-like product obtained by dispersing 0.1% by mass of CELISH KY100G and 0.1% by mass of a methacryloyloxyethyl phosphorylcholine polymer in purified water was charged, and the resulting mixture was circulated at a rotational peripheral speed of 25 m/s for 5 minutes to give a cellulose fiber dispersion.

The obtained cellulose fiber dispersion was freeze-dried at −45° C. using FD550 made by TOKYO RIKAKIKAI CO., LTD., and powderized using a pulverizer.

To 100 parts by mass of Polyamide 6, 3 parts by mass of the obtained cellulose fiber powder was blended, and the resulting blend was kneaded using a twin-screw kneading extruder (PCM-30 type twin-screw extruder made by IKE-GAI CORPORATION, screw diameter: 30 mmφ), discharged, and cut into pellets.

Then, using the obtained dried resin composition pellets, the same operation as in Example 1 was performed to give monofilaments having an average fiber diameter of 1.75 mm.

Comparative Examples 3 to 5

The same operation as in Comparative Example 2 was performed except that the type of the dispersant was changed as shown in the table to give dried resin composition pellets.

Then, using the obtained dried resin composition pellets, the same operation as in Example 1 was performed to give monofilaments having an average fiber diameter of 1.74 to 1.75 mm.

Comparative Examples 6 to 8

The polyamide resins shown in Table 1 were dry-blended and supplied to a main hopper of a twin-screw extruder. The blend was sufficiently melt-kneaded at 260° C., discharged into a strand, and cut to give resin composition pellets.

Then, using the obtained dried resin composition pellets, the same operation as in Example 1 was performed to give monofilaments having an average fiber diameter of 1.74 to 1.75 mm.

Comparative Example 9

The same operation as in Example 1 was performed except that the resin used was changed to PLA, the spinning temperature was changed to 200° C., and the discharge rate was changed to 31 g/min to give monofilaments having an average fiber diameter of 1.75 mm.

Comparative Example 10

The same operation as in Example 1 was performed except that the resin used was changed to ABS, the spinning temperature was changed to 220° C., and the discharge rate was changed to 31 g/min to give monofilaments having an average fiber diameter of 1.76 mm.

Comparative Example 11

The same operation as in Comparative Example 5 was performed except that the content of the dispersant was changed as shown in the table to give monofilaments having an average fiber diameter of 1.74 mm.

Comparative Example 12

The same operation as in Comparative Example 5 was performed except that the circulation was performed at a rotational peripheral speed of 25 m/s for 10 minutes to give monofilaments having an average fiber diameter of 1.74 mm.

Comparative Example 13

The same operation as in Comparative Example 5 was performed except that the circulation was performed at a rotational peripheral speed of 50 m/s for 5 minutes to give monofilaments having an average fiber diameter of 1.74 mm.

Comparative Example 14

The same operation as in Comparative Example 5 was performed except that the kneading using the twin-screw kneading extruder was performed twice to give monofilaments having an average fiber diameter of 1.74 mm.

The compositions of the resin compositions obtained in Examples 1 to 11 and Comparative Examples 1 to 13, and the evaluation results of the monofilaments and the shaped objects obtained therefrom are shown in Tables 1 and 2.

TABLE 1

| | | Composition of resin composition | | | | | | Melting point of resin composition ° C. | Evaluation of monofilaments | |
|---|---|---|---|---|---|---|---|---|---|---|
| | | Resin | | Cellulose fibers | | | Additive | | | |
| | | Type | Content parts by mass | Type | Average fiber diameter* nm | Content parts by mass | Type | Content parts by mass | Yarn-making properties | Diameter mm |
| Example | 1 | Polyamide 6 | 100 | KY100G | 45 | 3 | — | — | 225 | ○ | 1.74 |
| | 2 | Polyamide 66 | 100 | KY100G | 76 | 3 | — | — | 265 | ○ | 1.75 |
| | 3 | Polyamide 6 | 100 | KY100G | 45 | 5 | — | — | 225 | ○ | 1.76 |
| | 4 | Polyamide 6 | 100 | KY100G | 45 | 10 | — | — | 225 | ○ | 1.73 |
| | 5 | Polyamide 6 | 100 | KY100G | 62 | 20 | — | — | 225 | ○ | 1.76 |
| | 6 | Polyamide 6 | 100 | KY100S | 130 | 3 | — | — | 225 | ○ | 1.74 |
| | 7 | Polyamide 6 | 100 | Bacterial cellulose | 40 | 3 | — | — | 225 | ○ | 1.75 |
| | 8 | Polyamide 6 | 100 | Waste threads | 1370 | 3 | — | — | 225 | ○ | 1.76 |
| | 9 | Polyamide 6/ Polyamide 66 | 85/15 | KY100G | 65 | 4.3 | — | — | 220 or more | ○ | 1.74 |
| | 10 | Polyamide 6/ Polyamide 11 | 85/15 | KY100G | 79 | 4.3 | — | — | 180 or more | ○ | 1.73 |
| | 11 | Polyamide 6/ Polyamide 12 | 85/15 | KY100G | 90 | 4.3 | — | — | 170 or more | ○ | 1.74 |

| | | Evaluation of shaped object | | | | | | Comprehensive evaluation of shaped object |
|---|---|---|---|---|---|---|---|---|
| | | Shaping capability (1) | Size stability % | Size change rate (2) % | Warpage | Bleed-out | Adhesive properties (3) | |
| Example | 1 | ⊙ | 0.1 ⊙ | 1.1 ⊙ | ○ | ○ | ○ | ⊙ |
| | 2 | ○ | 0.1 ⊙ | 1.3 ○ | ○ | ○ | ○ | ○ |
| | 3 | ⊙ | 0.1 ⊙ | 1.2 ⊙ | ○ | ○ | ○ | ⊙ |
| | 4 | ⊙ | 0.1 ⊙ | 0.8 ⊙ | ○ | ○ | ○ | ⊙ |
| | 5 | ○ | 0.1 ⊙ | 1.2 ⊙ | ○ | ○ | ○ | ○ |
| | 6 | Δ | 0.1 ⊙ | 1.7 Δ | ○ | ○ | ○ | Δ |
| | 7 | ⊙ | 0.1 ⊙ | 1.2 ⊙ | ○ | ○ | ○ | ⊙ |
| | 8 | Δ | 0.2 ○ | 1.8 Δ | ○ | ○ | ○ | Δ |
| | 9 | ○ | 0.1 ⊙ | 1.1 ⊙ | ○ | ○ | ○ | ○ |
| | 10 | ○ | 0.1 ⊙ | 1.1 ⊙ | ○ | ○ | ○ | ○ |
| | 11 | ○ | 0.1 ⊙ | 1.0 ⊙ | ○ | ○ | ○ | ○ |

(1) Shaping capability with 3D printer,
(2) Rate of size change due to water,
(3) Adhesive properties between laminated resin layers,
*Average fiber diameter in shaped object,
**Unmeasurable

TABLE 2

| | | Composition of resin composition | | | | | | | Melting point of resin composition ° C. | Evaluation of monofilaments | |
|---|---|---|---|---|---|---|---|---|---|---|---|
| | | Resin | | Cellulose fibers | | | Additive | | | | |
| | | Type | Content parts by mass | Type | Average fiber diameter* nm | Content parts by mass | Type | Content parts by mass | | Yarn-making properties | Diameter mm |
| Comparative Example | 1 | Polyamide 6 | 100 | — | — | — | — | — | 225 | ○ | 1.75 |
| | 2 | Polyamide 6 | 100 | KY100G | 200 nm or more | 3 | Dispersant a | 3 | 225 | ○ | 1.73 |
| | 3 | Polyamide 6 | 100 | KY100G | 200 nm or more | 3 | Dispersant b | 3 | 225 | ○ | 1.75 |
| | 4 | Polyamide 6 | 100 | KY100G | 200 nm or more | 3 | Dispersant c | 3 | 225 | ○ | 1.74 |
| | 5 | Polyamide 6 | 100 | KY100G | 120 | 3 | Dispersant d | 3 | 225 | ○ | 1.74 |
| | 6 | Polyamide 6/ Polyamide 66 | 85/15 | — | — | — | — | — | 220 or more | ○ | 1.75 |
| | 7 | Polyamide 6/ Polyamide 11 | 85/15 | — | — | — | — | — | 180 or more | ○ | 1.74 |

TABLE 2-continued

| | | | | | | | | | | | |
|---|---|---|---|---|---|---|---|---|---|---|---|
| | 8 | Polyamide 6/ Polyamide 12 | 85/15 | — | — | — | — | — | 170 or more | ○ | 1.74 |
| | 9 | PLA | 100 | — | — | — | — | — | 170 | ○ | 1.75 |
| | 10 | ABS | 100 | — | — | — | — | — | 225 | ○ | 1.76 |
| | 11 | Polyamide 6 | 100 | KY100G | 200 nm or more | 3 | Dispersant d | 10 | 225 | ○ | 1.75 |
| | 12 | Polyamide 6 | 100 | KY100G | 200 nm or more | 3 | Dispersant d | 3 | 225 | ○ | 1.76 |
| | 13 | Polyamide 6 | 100 | KY100G | 200 nm or more | 3 | Dispersant d | 3 | 225 | ○ | 1.74 |
| | 14 | Polyamide 6 | 100 | KY100G | 200 mn or more | 3 | Dispersant d | 3 | 225 | ○ | 1.76 |

| | | Evaluation of shaped object | | | | | | Comprehensive |
|---|---|---|---|---|---|---|---|---|
| | | Shaping capability (1) | Size stability % | Size change rate (2) % | Warpage | Bleedout | Adhesive prpperties (3) | evaluation of shaped object |
| Comparative Example | 1 | ○ | 1.1 X | 2.7 X | X | ○ | X | X |
| | 2 | Δ | 1.2 X | 2.7 X | X | X | X | X |
| | 3 | Δ | 1.1 X | 2.9 X | X | X | X | X |
| | 4 | Δ | 1.2 X | 2.9 X | X | X | X | X |
| | 5 | Δ | 1.0 X | 2.5 X | X | X | X | X |
| | 6 | Δ | 1.0 X | 2.7 X | X | ○ | X | X |
| | 7 | Δ | 1.2 X | 2.2 X | X | ○ | X | X |
| | 8 | Δ | 1.1 X | 2.1 X | X | ○ | X | X |
| | 9 | ○ | 0.6 X | ND** | Δ | ○ | ○ | X |
| | 10 | ○ | 0.8 X | 2.9 X | X | ○ | X | X |
| | 11 | Δ | 1.3 X | 2.6 X | X | X | X | X |
| | 12 | Δ | 1.4 X | 2.9 X | X | X | X | X |
| | 13 | Δ | 1.2 X | 2.5 X | X | X | X | X |
| | 14 | Δ | 1.4 X | 2.6 X | X | X | X | X |

(1) Shaping capability with 3D printer,
(2) Rate of size change due to water,
(3) Adhesive properties between laminated resin layers,
*Average fiber diameter in shaped object,
**Unmeasurable Comparative Examples 11 to 14 differ from Comparative Example 5 as to dispersion conditions or kneading conditions.

The resin compositions of Examples 1 to 11 had a high melting point, and the monofilaments obtained from the resin compositions were excellent in yarn-making properties and were capable of being shaped in accordance with designed sizes by a fused deposition modeling method-3D printer. In addition, the obtained shaped objects had a small warpage, had small changes in sizes due to water, and had high adhesive properties between resin layers laminated by a fused deposition modeling method-3D printer. For this reason, these resin compositions were capable of being suitably used as a shaping material of a fused deposition modeling method-3D printer.

In Comparative Examples 1 and 6 to 8, since a polyamide containing no cellulose fibers was used, the resin compositions were incapable of being shaped in accordance with designed sizes by a fused deposition modeling method-3D printer. Moreover, the shaped objects had poor adhesive properties between the laminated resin layers.

In Comparative Examples 2 to 5, since no cellulose fibers were added during polymerization into a polyamide, and a resin composition containing cellulose fibers added by kneading using a dispersant was used, the resin compositions were incapable of being shaped in accordance with designed sizes by a fused deposition modeling method-3D printer. In addition, the obtained shaped objects had small changes in sizes due to water and a large warpage, and caused bleed-out. Moreover, the shaped objects had poor adhesive properties between the laminated resin layers.

In Comparative Example 9, since PLA was used, the obtained shaped object had poor heat-resisting properties. When the shaped object was immersed in water for 1000 hours, it deteriorated, and it was impossible to even measure the rate of size change due to water.

In Comparative Example 10, since ABS was used, the shaped object had large changes in sizes due to water and a large warpage. Moreover, the shaped objects had poor adhesive properties between the laminated resin layers.

In Comparative Examples 11 to 14, no cellulose fibers were added during polymerization into a polyamide, a resin composition containing cellulose fibers added by kneading using a dispersant was used, and the dispersion or kneading was further sufficiently performed. However, the resin compositions were incapable of being shaped in accordance with designed sizes by a fused deposition modeling method-3D printer. In addition, the obtained shaped objects had small changes in sizes due to water and a large warpage, and caused bleed-out. Moreover, the shaped objects had poor adhesive properties between the laminated resin layers.

INDUSTRIAL APPLICABILITY

The resin composition of the present invention is useful for producing so-called filaments supplied to a 3D printer.

The filamentary molded body of the present invention is useful as so-called filaments supplied to a 3D printer.

The invention claimed is:

1. A filamentary molded body for a shaping material of a fused deposition modeling method-3D printer, comprising a resin composition for a shaping material of a fused deposition modeling method-3D printer, wherein the resin composition comprises cellulose fibers and does not comprise a dispersant which is a compound belonging to a nonionic surfactant, an amphoteric surfactant, an anionic surfactant, or a cationic surfactant in a polyamide, and the filamentary molded body has a diameter of 1.5 to 3.2 mm.

2. The filamentary molded body of claim 1, wherein the cellulose fibers in a shaped object obtained from the filamentary molded body by a 3D printer have an average fiber diameter of 10 μm or less.

3. The filamentary molded body of claim 1, wherein the polyamide is polycaproamide (Polyamide 6).

4. The filamentary molded body of claim 1, wherein the polyamide is a mixture of polycaproamide (Polyamide 6) with Polyamide 66, Polyamide 11, or Polyamide 12.

5. The filamentary molded body of claim 1, wherein, in a shaped object obtained from the filamentary molded body by a 3D printer, the cellulose fibers have an average fiber diameter of 100 nm or less.

6. A shaped object obtained by shaping the filamentary molded body of claim 1.

7. A method for producing the filamentary molded body of claim 1, the method comprising:
   adding cellulose fibers during polymerization into a polyamide.

* * * * *